(12) United States Patent
Mastek et al.

(10) Patent No.: US 9,023,474 B2
(45) Date of Patent: May 5, 2015

(54) GLASS BATCH MATERIALS HAVING A CORE-SHELL STRUCTURE

(71) Applicant: Owens-Brockway Glass Container Inc., Perrysburg, OH (US)

(72) Inventors: Witold W. Mastek, Waterville, OH (US); Desikan Sundararajan, Toledo, OH (US); Terence J. Clark, Sanford, MI (US); Melisa Y. Zambrano Becerra, Lima (PE)

( * ) Notice: Subject to any disclaimer, the term of this patent is extended or adjusted under 35 U.S.C. 154(b) by 1 day.

(21) Appl. No.: 13/837,962

(22) Filed: Mar. 15, 2013

(65) Prior Publication Data

US 2014/0274652 A1 Sep. 18, 2014

(51) Int. Cl.
*C03C 1/02* (2006.01)
*C03C 3/087* (2006.01)
*C03B 1/02* (2006.01)

(52) U.S. Cl.
CPC . *C03C 1/02* (2013.01); *C03C 1/026* (2013.01); *C03C 3/087* (2013.01); *C03B 1/02* (2013.01)

(58) Field of Classification Search
USPC .................................. 428/403, 404; 427/212
IPC ................. C03C 1/02,1/026, 3/087; C03B 1/02
See application file for complete search history.

(56) References Cited

U.S. PATENT DOCUMENTS

| 2,366,473 | A | 1/1945 | Bair |
| 2,578,110 | A | 12/1951 | Tooley |
| 3,542,534 | A | 11/1970 | Yamamoto |
| 3,907,956 | A | 9/1975 | Meunier |
| 3,914,364 | A | 10/1975 | Engelleitner et al. |
| 3,956,446 | A | 5/1976 | Eirich et al. |
| 3,969,100 | A | 7/1976 | Kuna et al. |
| 4,023,976 | A | 5/1977 | Bauer et al. |
| 4,031,175 | A | 6/1977 | Cooper |
| 4,238,217 | A | 12/1980 | Stepanek et al. |
| 4,252,754 | A | 2/1981 | Nakaguchi et al. |
| 4,292,064 | A | 9/1981 | Propster |
| 4,293,324 | A | 10/1981 | Saeman |
| 7,260,960 | B2 | 8/2007 | Carty |
| 7,937,969 | B2 | 5/2011 | Carty |
| 2008/0087044 | A1* | 4/2008 | Carty ........................... 65/29.12 |
| 2012/0061872 | A1* | 3/2012 | Cherdon et al. .............. 264/117 |

FOREIGN PATENT DOCUMENTS

| GB | 2487563 | * | 8/2012 |
| WO | 2012101429 | | 8/2012 |

OTHER PUBLICATIONS

PCT Int. Search Report and Written Opinion, PCT Serial No. PCT/US2014/020968, Int. Filing Date: Mar. 6, 2014, Applicant: Owens-Brockway Glass Container Inc., Mail Date: Jun. 2, 2014.

* cited by examiner

*Primary Examiner* — Leszek Kiliman

(57) ABSTRACT

A plurality of soda-lime glass batch materials are formed into granules that include a core and a shell surrounding the core. The core comprises a first portion of the plurality of glass batch materials, and the shell comprises a remaining portion of the plurality of glass batch materials. These core-shell granules can be melted in a glass furnace to produce molten soda-lime glass in less time and at a lower temperature than conventional soda-lime glass batch preparations.

37 Claims, 2 Drawing Sheets

GLASS BATCH MATERIALS HAVING A CORE-SHELL STRUCTURE

The present disclosure is directed to glass batch materials and methods of preparing said glass batch materials for melting in a glass furnace to produce molten glass.

BACKGROUND AND SUMMARY OF THE DISCLOSURE

Soda-lime glass, also called soda-lime-silica glass, is conventionally prepared by melting a mixture of glass-forming materials known as a "glass batch" in a furnace or tank until a substantially homogenous glass melt is produced. It is generally desirable to maintain intimate contact between the glass batch materials during the melting process in order to reduce the melting temperature and "residence time" of the glass melt, i.e., the time required to completely melt all crystalline materials of batch origin. Attempts at reducing glass melt residence times have included reducing the particle size of the materials used to prepare the glass batch. However, finely ground glass batches tend to create more dust and can result in segregation or separation of the glass batch materials due to differences in particle size or density.

A general object of the present disclosure is to provide a soda-lime glass batch in granule form, which can be used to improve the energy efficiency of a glass melting process by reducing the melting temperature and the residence time of the glass melt.

The present disclosure embodies a number of aspects that can be implemented separately from or in combination with each other.

A core-shell granule for producing soda-lime glass, in accordance with one aspect of the disclosure, includes: a plurality of glass batch materials in amounts according to a soda-lime glass batch composition; a core comprising a first portion of the plurality of glass batch materials; and a shell surrounding the core comprising a second portion of the plurality of glass batch materials.

A process for producing a soda-lime glass batch in granule form, in accordance with another aspect of the disclosure, includes: (a) providing a plurality of glass batch materials in amounts according to a soda-lime glass batch composition, (b) mixing a first portion of the plurality of glass batch materials with a first bonding agent to form core granules, and (c) mixing a remaining portion of the plurality of glass batch materials with the core granules and a second bonding agent to form core-shell granules. The plurality of glass batch materials includes a silicon (Si)-containing material, a calcium (Ca)-containing material, and a sodium (Na)-containing material, and the first portion includes a major portion of the silicon (Si)- and calcium (Ca)-containing materials provided with the plurality of glass batch materials, but only a minor portion of the sodium (Na)-containing material provided with the plurality of glass batch materials.

A process for producing soda-lime glass, in accordance with yet another aspect of the disclosure, includes: feeding soda-lime glass batch materials to a glass furnace, wherein said glass batch materials are in the form of layered granules comprising a core that includes silica and limestone, and at least one layer surrounding said core that includes silica and soda ash.

BRIEF DESCRIPTION OF THE DRAWINGS

The disclosure, together with additional objects, features, advantages and aspects thereof, will be best understood from the following description, the appended claims and the accompanying drawings, in which:

DETAILED DESCRIPTION OF PREFERRED EMBODIMENTS

According to embodiments of the present disclosure, a plurality of soda-lime glass-forming materials (or glass batch materials) are prepared in the form of granules having a core-shell structure and melted in a glass furnace to produce molten soda-lime glass. Each granule in and of itself constitutes a substantially complete soda-lime glass batch composition; however, the composition of each granule is not homogenous. Specifically, each granule has an inner core and an outer shell with differing chemical and/or physical properties. In particular, the materials in the shell of each granule are formulated to produce a binary $SiO_2$—$Na_2O$ system when melted, and the materials in the core of each granule are formulated melt after the materials in the shell to produce a ternary $SiO_2$—$Na_2O$—$CaO$ system. By forming the soda-lime glass batch materials into these specifically formulated core-shell granules, the glass batch materials can be melted at a lower temperature and in less time than a traditional soda-lime glass batch, which is prepared as a uniform loose powder mixture. The term "granule," as used herein, refers to a substantially spherical consolidated mass of solid particles that has been produced by conventional granulation processes and equipment.

Figure 1A:
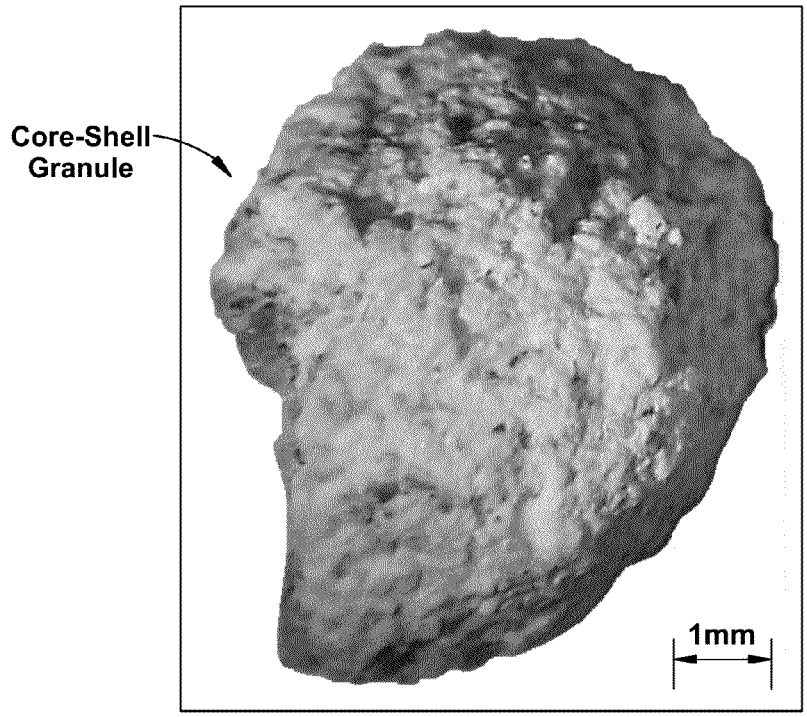
FIGS. 1A and 1B are microscope images of a core-shell granule that was formed in accordance with an exemplary embodiment of the disclosure.
Figure 1B:
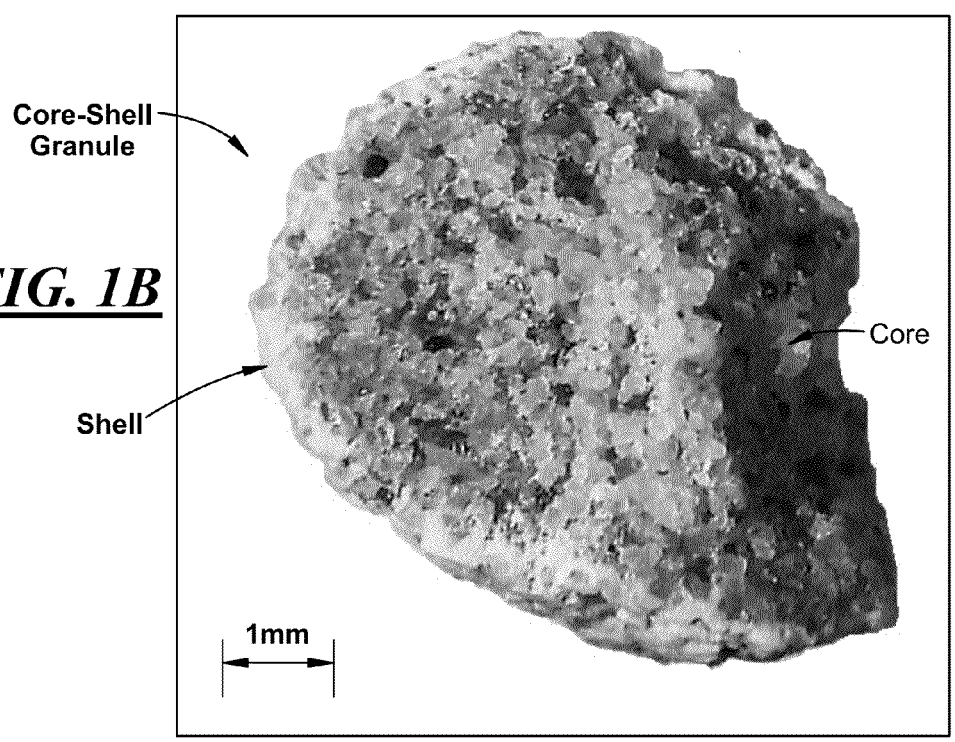

As shown in FIGS. 1A and 1B, each core-shell granule includes an inner core and an outer shell. The inner core includes a first portion of the materials needed to produce a soda-lime glass batch composition, and the outer shell includes a second or remaining portion of the materials needed to produce the soda-lime glass batch composition. In particular, the outer shell includes a selection of glass batch materials that is formulated to produce a binary $SiO_2$—$Na_2O$ system, and the inner core includes a selection of glass batch materials that are formulated to melt after the materials in the shell to produce a ternary $SiO_2$—$Na_2O$—$CaO$ system. In some embodiments, the core-shell granule also may include an outer layer of cullet to help increase the melting rate of the core-shell granule. The materials in the inner core of the granule preferably account for 70-90 wt. % of the overall core-shell granule.

The term "soda-lime glass batch," as used herein, means a combination of materials that can be melted together to produce soda-lime glass. Soda-lime glass typically includes: 60-75 wt. % $SiO_2$, 7-15 wt. % $Na_2O$, 6-12 wt. % $CaO$, and less than 5 wt. % other minor ingredients. More specifically, soda-lime glass includes: 70-75 wt. % $SiO_2$, 12-14 wt. % $Na_2O$, 10-12 wt. % $CaO$, 0.1-3 wt. % $Al_2O_3$, 0-2 wt. % $MgO$, 0-2 wt. % $K_2O$, and less than 1.0 wt. % other minor ingredients.

Figure 2:
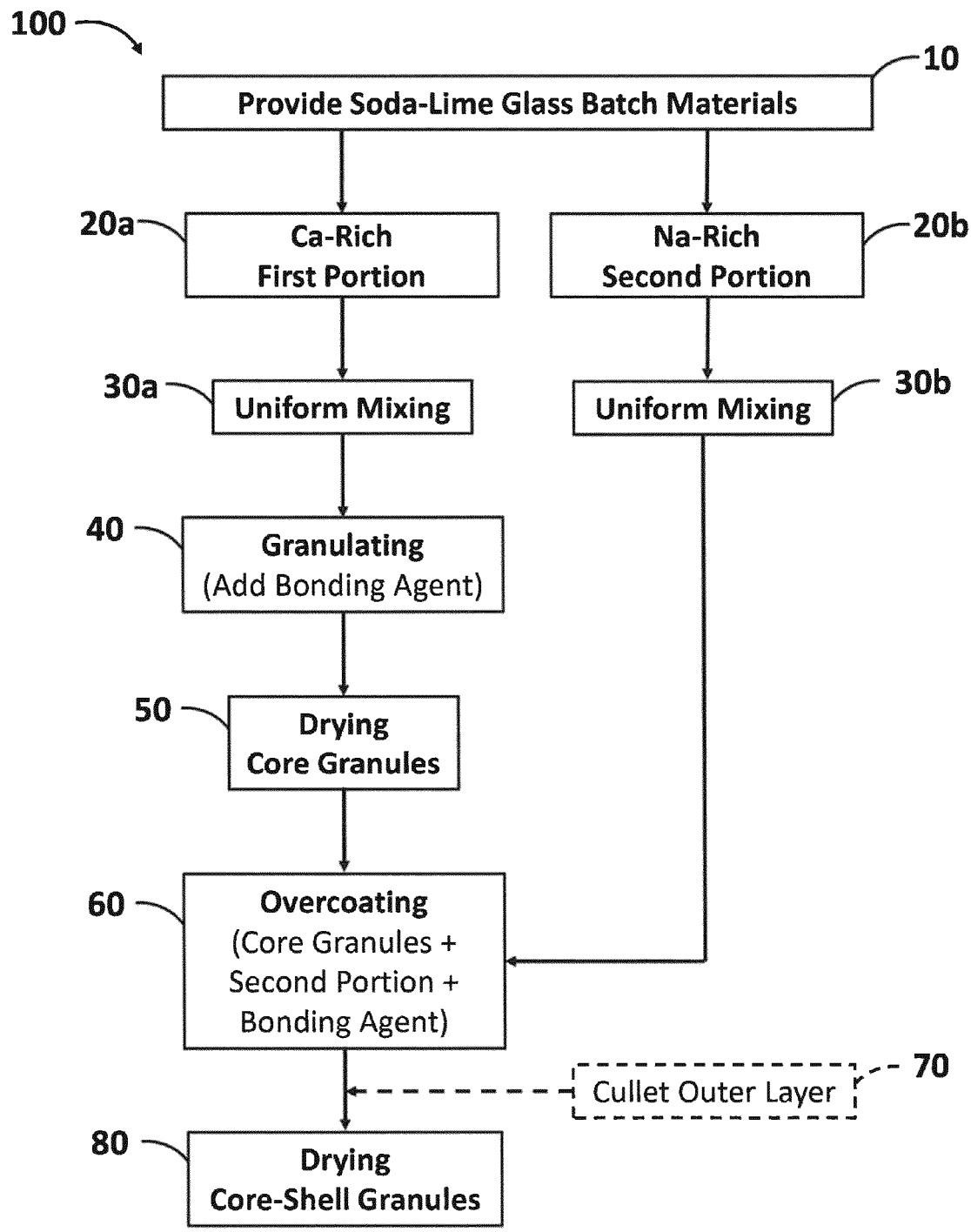
FIG. 2 is a flow chart illustrating a process for forming a plurality of soda-lime glass batch materials into core-shell granules, in accordance with an exemplary embodiment of the disclosure.

FIG. 2 illustrates an exemplary process 100 that can be used to form a plurality of core-shell granules. A first stage 10 of the process includes providing a plurality of glass batch materials in amounts according to a desired composition for a soda-lime glass batch. Accordingly, this stage of the process includes providing materials that contain a source of silicon (Si), sodium (Na), or calcium (Ca), or a combination thereof. Traditional sources of silicon (Si), sodium (Na), and calcium (Ca) in the glass manufacturing industry include sand ($SiO_2$), soda ash ($Na_2CO_3$), and limestone ($CaCO_3$), respectively, as well as cullet. In addition to these materials, other sources of silicon (Si), sodium (Na), and/or calcium (Ca) include: aragonite ($CaCO_3$), wollastonite ($CaSiO_3$), slags, SYNSIL®, dolomite ($CaMg(CO_3)_2$), forsterite ($Mg_2SiO_4$), belite ($Ca_2SiO_4$), trona ($Na_3(CO_3)(HCO_3).2H_2O$), calcium hydroxide ($Ca(OH)_2$), and sodium hydroxide (NaOH), to name a few. Other materials may additionally be provided at stage 10 in relatively minor amounts to form a soda-lime glass batch having a specific chemical composition. These additional materials may be referred to as "minors," and may include: materials that contain a source of aluminum (Al), potassium (K), and/or magnesium (Mg), as well as materials that may be needed to help refine, color, or adjust the redox state of the glass melt.

The glass batch materials provided in stage 10 are preferably provided in powder form. For example, each glass batch material provided in stage 10 may be in the form of a particulate mixture having a mean particle diameter in the range of about 30 μm to about 1 mm. In one specific example, each of the glass batch materials may be provided as a particulate mixture having a mean particle diameter in the range of about 200 μm to about 400 μm.

In stages 20a and 20b, the plurality of glass batch materials is divided into a first portion and a second or remaining portion. The first portion of the plurality of glass batch materials includes a mixture of silicon (Si)- and calcium (Ca)-containing materials. More specifically, the first portion preferably includes a major portion of the silicon (Si)- and calcium (Ca)-containing materials in the glass batch, and optionally a minor portion of the sodium (Na)-containing materials. In addition, the first portion preferably includes substantially all of the minor materials needed to complete the soda-lime glass batch composition.

The second portion of the plurality of glass batch materials includes a mixture of silicon (Si)- and sodium (Na)-containing materials. More specifically, the second portion preferably includes a major portion of the sodium (Na)-containing materials in the glass batch, a minor portion of the silicon (Si)-containing materials, and optionally a minor portion of the calcium (Ca)-containing materials in the glass batch. In most cases, the second portion of the glass batch materials will not include any of the minor materials.

In one specific embodiment, the soda-lime glass batch materials used to prepare the core-shell granules of the present disclosure include a combination of sand, soda ash, limestone, cullet, and relatively small amounts of other minor ingredients. In such case, the plurality of glass batch materials provided in stage 10 can be divided into a first portion and a second portion at stages 20a, 20b as shown in the table below.

| Soda-Lime Glass Batch Materials | First Portion (wt. %) | Second Portion (wt. %) | First & Second Portions (wt. %) |
| --- | --- | --- | --- |
| Silica | 60-100 | 0-40 | 100 |
| Soda Ash | 0-30 | 70-100 | 100 |
| Limestone | 70-100 | 0-30 | 100 |
| Cullet | 0-20 | 0-20 | 100 |
| Minor Ingredients | 0-100 | 0-100 | 100 |

In the embodiment shown in FIG. 2, the first and second portions of the plurality of glass batch materials are mixed separately from one another at stages 30a and 30b to form first and second powder mixtures, respectively. The first and second powder mixtures each have a substantially uniform composition; however, the chemical composition of the first powder mixture will be different from that of the second powder mixture. In particular, the first powder mixture includes a major portion of the calcium (Ca)-containing materials in the glass batch, and thus may be referred to as "calcium-rich." On the other hand, the second powder mixture includes a major portion of the sodium (Na)-containing materials in the glass batch, and thus may be referred to as "sodium-rich."

Stage 40 of the process involves granulating the first powder mixture into core granules for use in the subsequent formation of the core-shell granules of the present disclosure. Granulation of the first powder mixture may be accomplished using a wet granulation process. In general, wet granulation processes involve adding a suitable amount of a liquid bonding agent to a dry powder mixture with vigorous mixing until discrete granules of a desired size are formed. Agitation and/or mixing of the liquid bonding agent and the dry powder mixture is generally performed using mechanical stirrers or paddles, a pan, disk, or drum type granulator, or a fluidized bed. More specifically, granulation of the first powder mixture into core granules may be accomplished by adding suitable amounts of a liquid bonding agent to the first powder mixture until core granules having a mean diameter in the range of about 1 mm to about 4 mm are formed. For example, a bonding agent may be added in an amount constituting up to about 20 wt. % of the first powder mixture to form the core granules. In one specific example, a bonding agent may be added in an amount constituting between 5 wt. % and 10 wt. % of the first powder mixture.

The bonding agent used in stage 40 to prepare the core granules, or in stage 60 to prepare the core-shell granules, may be in the form of a solution or a suspension that includes a binder material and a solvent, e.g., water. Suitable liquid bonding agents having a desired binder material concentration may be purchased from commercial sources, or prepared by combining a suitable dry binder material with a solvent and stirring the mixture until a solution or suspension is formed. Suitably bonding agents may include about 50 wt. % binder material. For example, the binder material may suitably constitute between 40 wt. % and 60 wt. % of the bonding agent. The overall amount of bonding agent used in stages 40 and 60 to prepare the core-shell granules may constitute up to 30 wt. % of the soda-lime glass batch materials, with 60-80 wt. % of the bonding agent being used to prepare the core granules at stage 40, and the remaining amount being used to prepare the core-shell granules at stage 60. Suitable binder materials for use in the bonding agent may include alkali or alkaline earth metal hydroxides, alkali or alkaline earth metal silicates, aluminum silicates, or a combination thereof. Examples of some specific binder materials that may suitably be used individually or in combination with each other to prepare the bonding agent include: sodium hydroxide (NaOH), sodium silicate ($Na_2O.xSiO_2$), lithium silicate ($Li_2O.xSiO_2$), potassium silicate ($K_2O.xSiO_2$), bentonite, kaolin, zeolites, diatomaceous earth, feldspar, and gypsum, to name a few. If sodium silicate is used as the binder material, the ratio of $SiO_2$ to $Na_2O$ in the bonding agent may range from 1:1 to 4:1.

After formation, the core granules may be dried, for example, using a batch or continuous dryer, or a fluid bed dryer, stage 50. The core granules may be dried at a temperature of about 75 degrees Celsius for about 2 hours. For example, the core granules may be dried at a temperature in the range of 50 degrees Celsius to 200 degrees Celsius for 0.1 hours to 5 hours.

At stage 60, the core granules are uniformly coated with an overlying layer, or an "overcoat," of material that includes the second powder mixture. The overcoat may be formed on the core granules by mixing the core granules with the second powder mixture, and then adding a liquid bonding agent to the mixture with continued agitation and/or stirring. Suitable amounts of the liquid bonding agent are preferably added to the mixture of the core granules and the second powder mixture until discrete granules having a core and a suitably thick overcoat are formed. The core granules, the second powder mixture, and the bonding agent are preferably mixed together such that the particulate materials in the second powder mixture adhere to the core granules and form shell-like structures around the core granules, instead of forming new granules. The liquid bonding agent may be added in suitable amounts to form core-shell granules having a mean diameter in the range of about 1 mm to about 10 mm. In one specific example, core-shell granules having a mean diameter in the range of 1 mm to 4 mm may be formed. The liquid bonding agent used to form the core-shell granules may be added in an amount constituting up to about 20 wt. % of the second powder mixture. For example, the liquid bonding agent may be added in an amount constituting between 50 wt. % and 10 wt. % of the second powder mixture.

In some embodiments, the core-shell granules produced by the above stages may be coated with an additional outer layer of cullet, stage 70. If it is desirable to form an outer layer of cullet on the core-shell granules, this outer layer may suitably be formed on the core-shell granules before they are dried. The outer layer of cullet may be formed by mixing the core-shell granules with particles of cullet. A bonding agent may be added.

Thereafter, the core-shell granules, and the optional outer layer of cullet, are dried at stage 80. Any of the techniques, temperatures, and/or times listed above with respect to drying of the core granules at stage 50 may suitably be used for drying of the core-shell granules at this stage. After drying, the core portion and the shell portion of the core-shell granules may have a weight ratio of about 4:1. For example, the weight ratio of the core portion to the shell portion of the dried core-shell granules may be in the range of 3:1 to 6:1.

Core-shell granules formed in accordance with the present disclosure are formulated to control some of the chemical reactions that occur between the glass batch materials during the melting process. In particular, the core-shell granules are configured so that a major portion of the sodium (Na)-containing materials first react with silica ($SiO_2$) to form a binary $SiO_2$—$Na_2O$ system, and then this binary $SiO_2$—$Na_2O$ system is allowed to react with the remaining components of the glass batch to form a ternary $SiO_2$—$Na_2O$—$CaO$ system. By controlling the chemical reactions of the glass batch materials in this way, the glass batch materials may be melted at a relatively low temperature and for a relatively short time, as compared to traditional glass batch melting processes.

EXAMPLE

Core-shell granules were prepared in a laboratory environment from a combination of traditional glass batch materials, and the melting times and temperatures required to completely dissolve all of the sand grains in the resulting melts was observed. For comparison, a loose powder mixture including the same glass batch materials in the same proportions as the core-shell granules was also prepared, and the melting times and temperatures of the loose powder mixture were compared with that of the core-shell granules. The core-shell granules and the loose powder mixture each had a soda-lime glass batch composition that included: 58.94 wt % sand, 18.73 wt % soda ash, 17.34 wt % limestone, and 5 wt % nepheline syenite (a source of aluminum). The mesh size of all of the glass batch materials was −60 mesh.

The core-shell granules were prepared by first dividing the traditional glass batch materials into a core portion and a shell portion as shown in the table below.

| Glass Batch Materials | Core (wt. %) | Shell (wt. %) | Total (wt. %) |
|---|---|---|---|
| Sand | 80 | 20 | 100 |
| Soda Ash | 30 | 70 | 100 |
| Limestone | 100 | 0 | 100 |
| Nepheline Syenite | 100 | 0 | 100 |

Core granules were formed by granulating the core materials in a drum granulator using an aqueous sodium silicate bonding agent, which was sprayed onto the core materials as they were mixed in the drum granulator. The as-formed core granules were screened using an 8 mesh sieve and an 16 mesh sieve. Oversized granules (+8 mesh) were crushed and recycled back into the drum granulator, and undersized granules (−16 mesh) were directly recycled back to the drum granulator. All of the core granules passed to the next step of the process were −8/+16 mesh. The core granules were then dried in a batch dryer at a temperature of 75° C. for 2 hours to solidify and harden the granules.

The dried core granules were then overcoated with the remaining glass batch materials by introducing the core granules into a drum granulator along with the shell materials and an aqueous sodium silicate bonding agent. As before, the bonding agent was sprayed onto the core granules and the shell materials as they were mixed in the drum granulator. The as-formed core-shell granules were −10/+16 mesh. The core-shell granules were then dried in a batch dryer at a temperature of 75° C. for 2 hours to solidify and harden the granules.

The molar ratio of $SiO_2$ to $Na_2O$ in the aqueous sodium silicate bonding agent was 3.22:1. The overall amount of bonding agent used to prepare the core-shell granules constituted about 14 wt % of the core and shell materials, with the sodium silicate constituting about 5 wt % and water making up the remainder.

Five samples of the core-shell granules and fives samples of the loose powder mixture of glass batch materials were individually melted in a laboratory furnace for 30, 60, 90, 120, and 150 minutes, respectively, at a temperature of about 1400° C. If was observed that the core-shell granules were able to produce a homogenous batch-free glass melt after only 90 minutes of being melted, while the loose powder mixture of glass batch materials had to be melted for at least 120 minutes before the resulting melt was batch-free.

There thus has been disclosed a soda-lime glass batch material having a core-shell structure and a process for producing said glass batch material that fully satisfies all of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. The disclosure is intended to embrace all such modifications and variations as fall within the spirit and broad scope of the appended claims.

The invention claimed is:

1. A core-shell granule for producing soda-lime glass, which includes:
   a plurality of glass batch materials in amounts according to a soda-lime glass batch composition;

a core including a calcium-rich portion of the plurality of glass batch materials; and a shell surrounding the core including a sodium-rich portion of the plurality of glass batch materials, wherein the plurality of glass batch materials includes a silicon (Si)-containing material and the core includes greater than 50 wt. % of the silicon (Si)-containing material present in the plurality of glass batch materials.

2. The core-shell granule set forth in claim 1, wherein the plurality of glass batch materials includes a calcium (Ca)-containing material and a sodium (Na)-containing material.

3. The core-shell granule set forth in claim 2, wherein the core includes greater than 50 wt. % of the calcium (Ca)-containing material present in the plurality of glass batch materials.

4. The core-shell granule set forth in claim 2, wherein the shell includes greater than 50 wt. % of the sodium (Na)-containing material present in the plurality of glass batch materials.

5. The core-shell granule set forth in claim 1, wherein the shell includes a remaining portion of the silicon (Si)-containing material present in the plurality of glass batch materials.

6. The core-shell granule set forth in claim 1 wherein the core includes 70-90 wt. % of the plurality of glass batch materials.

7. The core-shell granule set forth in claim 1, wherein the plurality of glass batch materials includes a calcium (Ca)-containing material, a sodium (Na)-containing material and a minor ingredient selected from the group consisting of: an aluminum (Al)-containing material, a potassium (K)-containing material and a magnesium (Mg)-containing material.

8. The core-shell granule set forth in claim 1 further including an outer layer of cullet surrounding the shell.

9. The core-shell granule set forth in claim 1 wherein at least one of the core and the shell include a binder material.

10. The core-shell granule set forth in claim 1, wherein the shell is formulated to produce a binary $SiO_2$—$Na_2O$ system when melted, and the core is formulated to melt after the shell to produce a ternary $SiO_2$—$Na_2O$—$CaO$ system.

11. A process for producing a soda-lime glass batch in granule form, which includes the steps of:
(a) providing a plurality of glass batch materials in amounts according to a soda-lime glass batch composition, the plurality of glass batch materials including a silicon (Si)-containing material, a calcium (Ca)-containing material, and a sodium (Na)-containing material;
(b) mixing a first portion of the plurality of glass batch materials with a first bonding agent to form core granules, wherein the first portion includes greater than 50 wt. % of the silicon (Si)-containing material provided with the plurality of glass batch materials, greater than 50 wt. % of the calcium (Ca)-containing material provided with the plurality of glass batch materials, and less than 50 wt. % of the sodium (Na)-containing material provided with the plurality of glass batch materials; and
(c) mixing a remaining portion of the plurality of glass batch materials with the core granules and a second bonding agent to form core-shell granules having inner cores and outer shells with different chemical compositions.

12. The process set forth in claim 11 further including, after step (c), drying the core-shell granules.

13. A process for producing soda-lime glass, which includes:
melting a soda-lime glass batch produced by the process set forth in claim 11 in a glass furnace.

14. The process set forth in claim 11, wherein the first portion of the plurality of glass batch materials accounts for 70-90 wt. % of each of the core-shell granules.

15. The process set forth in claim 11, wherein the first bonding agent, the second bonding agent, or both the first and second bonding agents include a binder material of an alkali or alkaline earth metal hydroxide, an alkali or alkaline earth metal silicate, an aluminum silicate, or a combination thereof.

16. The process set forth in claim 11, wherein the plurality of glass batch materials provided in said step (a) includes at least one minor ingredient selected from the group consisting of an aluminum (Al)-containing material, a potassium (K)-containing material and a magnesium (Mg)-containing material, and the first portion of the plurality of glass batch materials includes greater than 50 wt. % of the at least one minor ingredient.

17. A process for producing soda-lime glass that includes:
(a) providing a plurality of glass batch materials in amounts according to a soda-lime glass batch composition, the plurality of glass batch materials including one or more silicon (Si)-containing materials, one or more calcium (Ca)-containing materials, and one or more sodium (Na)-containing materials, and wherein the plurality of glass batch materials are provided in the form of layered granules that include a core and a shell surrounding the core, with the core including greater than 50 wt. % of the one or more silicon (Si)-containing materials, greater than 50 wt. % of the one or more calcium (Ca)-containing materials, and less than 50 wt. % of the one or more sodium (Na)-containing materials;
(b) feeding the layered granules to a glass furnace; and
(c) heating the layered granules in the glass furnace to form a soda-lime glass melt.

18. The process set forth in claim 17, wherein the core accounts for 70-90 wt. % of each of the layered granules.

19. The process set forth in claim 17, wherein said step (c) includes:
melting at least a portion of the glass batch materials in the shells of the layered granules before prior to melting the glass batch materials in the cores of the layered granules.

20. The process set forth in claim 17, wherein said step (c) includes:
melting a portion of the glass batch materials in the shells of the layered granules to produce a binary $SiO_2$—$Na_2O$ system; and then melting a portion of the glass batch materials in the cores of the layered granules to produce a ternary $SiO_2$—$Na_2O$—$CaO$ system.

21. A soda-lime glass batch in granule form produced by the process set forth in claim 11.

22. A soda-lime glass produced by the process set forth in claim 13.

23. A soda-lime glass produced by the process set forth in claim 17.

24. The process set forth in claim 17, wherein the plurality of glass batch materials provided in said step (a) includes at least one minor ingredient selected from the group consisting of an aluminum (Al)-containing material, a potassium (K)-containing material and a magnesium (Mg)-containing material, and the core includes greater than 50 wt. % of the at least one minor ingredient.

25. The process set forth in claim 11, wherein the glass batch materials provided in said step (a) include silica ($SiO_2$), soda ash ($Na_2CO_3$) and limestone ($CaCO_3$), and the first portion includes 60-100 wt. % of the silica provided with the plurality of glass batch materials, 70-100 wt. % of the limestone provided with the plurality of glass batch materials, and 0-30 wt. % of the soda ash provided with the plurality of glass batch materials.

26. A process for producing a soda-lime glass batch in granule form, which includes the steps of:
(a) providing a plurality of glass batch materials in amounts according to a soda-lime glass batch composition, the plurality of glass batch materials including a silicon (Si)-containing material, a calcium (Ca)-containing material, and a sodium (Na)-containing material;
(b) mixing a first portion of the plurality of glass batch materials with a first bonding agent to form core granules, wherein the first portion includes a major portion of the silicon (Si)- and calcium (Ca)-containing materials provided with the plurality of glass batch materials, but only a minor portion of the sodium (Na)-containing material provided with the plurality of glass batch materials; and
(c) mixing a remaining portion of the plurality of glass batch materials with the core granules and a second bonding agent to form core-shell granules.

27. The process set forth in claim 26 further including, after step (c), drying the core-shell granules.

28. The process set forth in claim 27 wherein, after the drying step, the core-shell granules have a weight ratio of 3:1 to 6:1.

29. The process set forth in claim 26 wherein the core-shell granules have inner cores and outer shells with different chemical compositions, wherein the outer shells include at least some of the silicon (Si)-containing materials, and in an amount up to 40 wt. % of the silicon (Si)-containing materials.

30. The process set forth in claim 29 wherein materials of the core granules account for 70-90 wt. % of the overall core-shell granules.

31. The process set forth in claim 26 wherein each of the plurality of glass batch materials are provided as particular mixture having a mean particle diameter of 200 μm to about 400 μm.

32. The process set forth in claim 26 wherein the core granules have a mean diameter of 1 mm to 4 mm.

33. The process set forth in claim 26 wherein core-shell granules have a mean diameter of 1 mm to 10 mm.

34. The process set forth in claim 26 wherein each of the plurality of glass batch materials are provided as particular mixture having a mean particle diameter of 200 μm to about 400 μm, the core granules have a mean diameter of 1 mm to 4 mm, and the core-shell granules have a mean diameter of 1 mm to 10 mm.

35. The process set forth in claim 26 further comprising the steps of:
(d) feeding the layered granules to a glass furnace; and
(e) heating the layered granules in the glass furnace at about 1400° C. to produce a homogenous batch-free glass melt after only 90 minutes.

36. The process set forth in claim 26 further comprising the step of coating the core-shell granules with an additional outer layer of cullet by mixing the core-shell granules with particles of cullet.

37. Core-shell granules produced by the process set forth in claim 26.

* * * * *